Patented June 26, 1951

2,557,968

UNITED STATES PATENT OFFICE

2,557,968
DECOMPOSITION OF ORGANIC HYDROPEROXIDES

George E. Hulse and Edwin J. Vandenberg, Wilmington, Del., assignors to Hercules Powder Company, Wilmington, Del., a corporation of Delaware No Drawing. Application November 24, 1948, Serial No. 61,931

17 Claims. (Cl. 260—592)

This invention relates to a process for the production of alcohols and ketones from tertiary organic hydroperoxides. More particularly, the invention relates to a process for the production of aromatic ketones and tertiary alcohols containing an aromatic nucleus by the reaction of $\alpha,\alpha$-dialkylarylmethyl hydroperoxides with the reduced form of certain electromotive couples.

It has been known that certain organic hydroperoxides would undergo thermal decomposition to produce various reaction products. However, since the $\alpha,\alpha$-dialkylarylmethyl hydroperoxides of this invention are relatively stable thermally, it has been desirable to discover a procedure different from thermal decomposition whereby the hydroperoxides could be decomposed to useful reaction products.

In accordance with this invention, it has been discovered that tertiary alcohols containing an aromatic nucleus and aromatic ketones may be produced by the reaction between an $\alpha,\alpha$-dialkylarylmethyl hydroperoxide having the structural formula

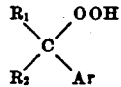

in which $R_1$ and $R_2$ represent alkyl groups and Ar represents a substituent selected from the group consisting of aryl and alkaryl groups, and the reduced form of an electromotive couple having a standard oxidation-reduction potential not less than about $-1.0$ volt.

The tertiary alcohols which may be produced by the process of this invention may be represented by the structural formula

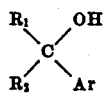

in which the symbols $R_1$, $R_2$, and Ar have the same significance as in the above-described formula for the hydroperoxides. These alcohols are predominantly produced by the action of the reduced form of an electromotive couple having a standard oxidation-reduction potential not less than about $-0.2$ volt.

Similarly, the reduced form of an electromotive couple having a standard oxidation-reduction potential of from about $-1.0$ volt to about $-0.3$ volt may be employed in the process of this invention to produce aromatic ketones in predominant amounts. The aromatic ketones so produced may be represented by the structural formula

in which the symbol Ar has the same significance that it had in the above-described formula for the hydroperoxides and in which the symbol R represents that one of the two alkyl groups represented by the symbols $R_1$ and $R_2$ in the formula for the hydroperoxides which is bound to the hydroperoxide molecule by the strongest carbon-carbon bond.

Mixtures of the above-described tertiary alcohols and aromatic ketones are produced by the utilization in the process of this invention of the reduced form of an electromotive couple having a standard oxidation-reduction potential within the intermediate range of from about $-0.3$ volt to about $-0.2$ volt.

It is possible to predict which of the two alkyl substituents ($R_1$, $R_2$) of any particular $\alpha,\alpha$-dialkylarylmethyl hydroperoxide will be bound to the hydroperoxide molecule by the strongest carbon-carbon bond and hence determine the aromatic ketones which may be produced by this invention. As a general rule, it may be stated that the strength of the carbon-carbon bond decreases as the size of the alkyl group bound to the original hydroperoxide molecule increases. Thus, from $\alpha$-methyl-$\alpha$-ethylbenzyl hydroperoxide, acetophenone, rather than ethylphenyl ketone will be predominantly produced by the process of this invention. When the two alkyl groups represented by the symbols $R_1$ and $R_2$ of the structural formula for the $\alpha,\alpha$-dialkylarylmethyl hydroperoxides are the same, only one aromatic ketone can, of course, result from the decomposition of the hydroperoxide molecule. Thus, in the case of $\alpha,\alpha$-dimethylbenzyl hydroperoxide, only acetophenone can be formed.

The standard oxidation-reduction potentials to which reference is made herein are the values in volts of the electrical potential of the couple in question determined at 25° C. under a pressure of one atmosphere with solutions of one molal activity referred to the potential of the hydrogen-hydrogen ion couple as zero. The sign of the oxidation-reduction potential values is positive, if the reduced form of the couple is a better reducing agent than hydrogen; negative, if the reduced form of the couple is a weaker reducing agent than hydrogen.

During the process of this invention there is formed in the reaction mixture an electromotive couple, the reduced form of which is one of the initial reactants. The reduced form may be designated a metallic reducing agent, and the term "metallic reducing agent" is utilized herein to designate all of those materials which contain metallic atoms and which are capable of acting as reducing agents, i. e., which are capable of donating an electron to other components of the reaction mixture. Thus, there is embraced by the term "metallic reducing agent" not only the free metallic ions such as the ferrous ion ($Fe^{++}$) but also complexes of such metallic ions such as the ferrous pyrophosphate complex. Likewise included are metals such as silver and metallic compounds which are substantially completely insoluble but which nevertheless act as reducing agents such as, for example, ferrous hydroxide ($Fe(OH)_2$) which forms the couple $$OH^- + Fe(OH)_2 \rightarrow Fe(OH)_3 + e^-$$

the standard oxidation-reduction potential of which is $+0.56$ volt.

The $a,a$-dialkylarylmethyl hydroperoxides which are operable in the process of this invention are tertiary organic hydroperoxides and may be prepared by the oxidation of alkyl-substituted aromatic organic compounds having the following structural formula

in which the symbols $R_1$, $R_2$, and Ar have the same significance as in the previously-described structural formula for the hydroperoxides. As illustrative of the alkyl-substituted aromatic organic compounds which may be oxidized to form these hydroperoxides, p-cymene, cumene, and diisopropylbenzene may be mentioned. These compounds lead to $a,a$-dimethyl-p-methylbenzyl, $a,a$-dimethylbenzyl, and $a,a$-dimethyl-p-isopropylbenzyl hydroperoxides, respectively. Also in the case of diisopropylbezene, there may be obtained $a,a,a',a'$-tetramethyl-p-xylylene dihydroperoxide. These compounds may also be named as aryl(dialkyl)methyl hydroperoxides; for example, $a,a$-dimethylbenzyl hydroperoxide may be designated as phenyl(dimethyl)methyl hydroperoxide.

Relative not only to the alkyl-substituted aromatic organic compounds which may be oxidized to produce the hydroperoxides, but also to the hydroperoxides themselves and to the ketones and alcohols which may be produced by the process of this invention, the aryl and alkaryl groups need not be derived from benzene as is the case in the specific hydroperoxides and aromatic hydrocarbons previously listed, for compounds containing aromatic nuclei derived from naphthalene, anthracene, phenanthrene, and the like are also operable. For the alkaryl groups the aryl portion thereof may be substituted with alkyl groups such as methyl, ethyl, propyl, isopropyl, butyl, isobutyl, secondary butyl, tertiary butyl, and the like to give alkaryl substituents. In the structural formulae for the hydroperoxides, the hydrocarbons from which they are derived and the alcohols formed, $R_1$ and $R_2$ may be either the same or different and may be represented by the same alkyl groups as those listed above as aryl substituents.

Although all of the organic hydroperoxides embraced by the structural formula previously mentioned are operable, $a,a$-dimethylbenzyl hydroperoxide, $a,a$-dimethyl-p-methylbenzyl hydroperoxide, $a,a$-dimethyl-p-isopropylbenzyl hydroperoxide, $a,a,a',a'$-tetramethyl-p-xylylene dihydroperoxide, $a$-ethyl-$a$-methylbenzyl hydroperoxide and $a,a$-dimethylnaphthylmethyl hydroperoxide are preferred. Particularly preferred is $a,a$-dimethylbenzyl hydroperoxide. From $a,a,a',a'$-tetramethyl-p-xylylene dihydroperoxide and from similar dihydroperoxides, tertiary aromatic dialcohols and diketones such as $a,a,a',a'$-tetramethyl-p-xylylene dialcohol and p-acetylacetophenone may be prepared. Likewise, mixed keto alcohols such as p-acetyl-$a,a$-dimethylbenzyl alcohol may be produced. In addition, from the dihydroperoxides there may be prepared analogous mixed keto hydroperoxides such as p-acetyl-$a,a$-dimethylbenzyl hydroperoxide and mixed hydroperoxy alcohols such as $a,a,a',a'$-tetramethyl-p-xylylene monoalcohol monohydroperoxide. The dihydroperoxides are the $a,a,a',a'$-tetraalkylaryldimethyl dihydroperoxides which are the further oxidation products of those $a,a$-dialkylarylmethyl hydroperoxides containing an additional alkyl substituent having a tertiary carbon atom attached directly to a carbon atom of the aromatic nucleus.

In the practice of this invention, several modifications of the hydroperoxide material may be utilized. The hydroperoxide may be used, for example, either in the form of the pure hydroperoxide, or in the form of a crude reaction mixture containing the hydroperoxide and obtained by the oxidation with molecular oxygen of an alkyl-substituted aromatic organic compound having the structural formula shown previously. When the hydroperoxide is obtained by such an oxidation, the oxidation usually is interrupted before all of the hydrocarbon has reacted in order to avoid or limit side reactions. In this manner, the $a,a$-dialkylarylmethyl hydroperoxide usually is obtained in mixture with smaller or larger amounts of the original hydrocarbon, which is an $a,a$-dialkylarylmethane, and the mixture also may contain secondary reaction products such as the corresponding alcohols, which are $a,a$-dialkylarylmethyl alcohols. The oxidation of cumene, for example, may lead to a reaction product containing $a,a$-dimethylbenzyl hydroperoxide, $a,a$-dimethylbenzyl alcohol, a small amount of acetophenone, and unchanged cumene. Such a reaction product may be used per se in the process of the invention. In case it is desirable, however, to obtain the hydroperoxide in a more concentrated form, the hydroperoxide may be separated from the other constituents of the crude reaction mixture. The hydroperoxides may be separated from the reaction mixtures by, for example, fractional distillation at very low pressures, or the order of 0.01 to 1.0 mm. of mercury, the hydroperoxides having higher boiling points than the related hydrocarbon, alcohol, and ketone. $a,a$-Dimethylbenzyl hydroperoxide, for example, distills at 60° C. under a pressure of 0.2 mm. and at 68° C. under a pressure of 0.3 mm. In some instances, the hydroperoxides also may be separated from the oxidation reaction mixtures by crystallization, which may be facilitated by first distilling off at least part of the hydrocarbon. Steam distillation usually is sufficient to remove the hydrocarbon. Another method of separating the hydroperoxides from the reaction products involves precipitation of the hydroperoxide with a concentrated aqueous solution (25% to 40%) of sodium hydroxide. The precipitate is crystalline.

The precipitate of $\alpha,\alpha$-dimethylbenzyl hydroperoxide, for example, analyzes for the sodium salt of the hydroperoxide associated with four molecules of water.

Having thus described the general nature of this invention, the following examples are offered to illustrate the practice thereof. All parts are by weight unless otherwise indicated.

EXAMPLE 1

$\alpha,\alpha$-Dimethylbenzyl hydroperoxide was reacted with several different metallic reducing agents in various concentrations and under various conditions of temperature and pH as indicated in Table 1. In all instances, the metallic reducing agent was added, with agitation, in the form of an aqueous solution to an aqueous suspension of the $\alpha,\alpha$-dimethylbenzyl hydroperoxide. Control tests in which no metallic reducing agent was employed were also carried out.

Table 1

| Reducing Agent and Source | Temperature | Reaction Time | pH | Moles of Reducing Agent Added per Hydroperoxide Molecule | Per Cent of Original Hydroperoxide Decomposed | Per Cent of Original Hydroperoxide Converted to $\alpha,\alpha$-Dimethylbenzyl Alcohol | Per Cent of Original Hydroperoxide Converted to Acetophenone |
|---|---|---|---|---|---|---|---|
| None | 20° C | 2 hrs | 5.7 |  | [1] 0 |  | 0 |
| None | Reflux | 1 hr | 4.0 |  | [1] 4 |  |  |
| None | do | 1 hr | 2.1 |  | [1] 89 | 5 | 13.4 |
| Co++(CoCl$_2$.6H$_2$O) | 20° C | 1 week | 4.0 | 2.02 | [2] 6 |  |  |
| Do | Reflux | 1 hr | 4.4 | 2.50 | [1] 18 |  |  |
| Do | do | 1 hr | 2.1 | 2.50 | [1] 83 | 5 | 16 |
| Mn++(MnSO$_4$.H$_2$O) | 20° C | 1 week | 4.0 | 2.02 | [2] 2 |  |  |
| Do | Reflux | 1 hr | 4.4 | 2.50 | [1] 11 |  | 11 |
| Do | do | 1 hr | 2.1 | 2.50 | [1] 83 |  | 19 |
| Fe++(FeSO$_4$.7H$_2$O) | 20° C | Instant | 4.0 | 1.44 | [2] 100 | 5 | 87 |
| Do | 5±2° C | 5 Min | 4.0 | 1.44 | [2] 100 | 5 | 87 |
| CuCl(CuCl) | 20° C | Instant | 2.1 | 2.02 | [2] 100 | 0 | 100 |
| Sn++(SnCl$_2$.2H$_2$O) | 20° C | do | 2 | 2.2 | [2] 100 | 100 | 0 |
| Cr++(CrCl$_2$) | 20° C | do | 4 | 2.2 | [2] 100 | 100 | 0 |

[1] $\alpha,\alpha$-Dimethylbenzyl hydroperoxide prepared by the air-oxidation of cumene and containing 70% of the hydroperoxide, 17% $\alpha,\alpha$-dimethylbenzyl alcohol, 5.6% acetophenone, and 7.4% unreacted cumene.
[2] $\alpha,\alpha$-Dimethylbenzyl hydroperoxide prepared by the air-oxidation of cumene and containing 46% of the hydroperoxide, 3.2% acetophenone, 2% $\alpha,\alpha$-dimethylbenzyl alcohol, and 48.8% unreacted cumene.

The data recorded in the above table clearly demonstrate the remarkable advantages which attend process of this invention. By virtue of this process, $\alpha,\alpha$-dialkylarylmethyl hydroperoxides may be converted in near quantitative yield either to the corresponding tertiary alcohols or aromatic ketones at temperatures far below the thermal decomposition points of the hydroperoxides.

It is apparent from an examination of the data recorded in Table 1 that the process of this invention is operable throughout widely varying conditions. That the $\alpha,\alpha$-dimethylbenzyl hydroperoxide decomposed when refluxed in the presence of cobaltous ion or manganous ion at a pH of 2.1 cannot be considered indicative of reaction involving these ions for the reason that the control sample to which no metallic ion was added was similarly decomposed. Furthermore, no appreciable quantity of $\alpha,\alpha$-dimethylbenzyl alcohol or acetophenone was formed by either of these reactions.

EXAMPLE 2

To 400 parts of water was added, with agitation, 59.5 parts of cobaltous chloride hexahydrate (CoCl$_2$.6H$_2$O) and 23.6 parts of $\alpha,\alpha$-dimethylbenzyl hydroperoxide. After the cobaltous chloride had dissolved and the hydroperoxide had become evenly dispersed throughout the aqueous medium, a quantity of 4 N aqueous sodium hydroxide, 20% in excess of that required to react with all of the cobaltous ions present, was added slowly and with agitation over a period of about one hour. By this means, cobaltous hydroxide was formed and the $\alpha,\alpha$-dimethylbenzyl hydroperoxide was decomposed.

The progress of the hydroperoxide decomposition reaction was followed by treating aliquot portion of the reaction mixture, after filtering off the cobaltous hydroxide, with acidified potassium iodide and noting the amount of iodine liberated by the unreacted hydroperoxide. The entire experiment was carried out under an inert atmosphere to prevent the air-oxidation of the metallic reducing agent. Upon completion of the addition of the sodium hydroxide, analysis of the reaction mixture indicated that 82% of the $\alpha,\alpha$-dimethylbenzyl hydroperoxide had been converted to $\alpha,\alpha$-dimethylbenzyl alcohol and that about 8.5% of the hydroperoxide had been converted to acetophenone. The above example demonstrates that the process of this invention is operable in alkaline medium to produce alcohols and ketones from $\alpha,\alpha$-dialkylarylmethyl hydroperoxides at room temperature in excellent yield.

This example also illustrates that metallic reducing agents, inoperable under a particular set of conditions, may be rendered operable by altering the reaction conditions. Thus, cobaltous ions, which in acidic medium are inoperable because of the low standard oxidation-reduction potential of the couple formed (−1.84 volts) are operable in alkaline medium to produce tertiary alcohols by the process of this invention. Under the conditions employed in this example, cobaltous hydroxide forms the couple $$OH^- + Co(OH)_2 \rightarrow Co(OH)_3 + e^-$$

which has a standard oxidation-reduction potential of about −0.2 volt. The $\alpha,\alpha$-dimethylbenzyl hydroperoxide employed in this example was prepared by the air oxidation of cumene and contained 70% of the hydroperoxide, 17% of $\alpha,\alpha$-dimethylbenzyl alcohol, 5.6% acetophenone and 7.4% unreacted cumene.

EXAMPLE 3

$\alpha,\alpha$-Dimethylbenzyl hydroperoxide was converted to $\alpha,\alpha$-dimethylbenzyl alcohol in a manner similar to that described in Example 2. In this case, however, manganous sulfate monohydrate (MnSO$_4$.H$_2$O) was employed as a reactant. The $\alpha,\alpha$-dimethylbenzyl hydroperoxide utilized was of the same composition as that described in Example 2. Likewise, the same reaction conditions, including addition of sodium hydroxide, as those described in Example 2 were employed. Under such conditions, manganous sulfate forms the couple $OH^- + Mn(OH)_2 \rightarrow Mn(OH)_3 + e^-$, the standard oxidation-reduction potential of which is +0.4 volt.

Four and one-half hours after the addition of the sodium hydroxide was begun, 93% of the α,α-dimethylbenzyl hydroperoxide had been consumed. After 23 hours the hydroperoxide was completely decomposed. Analysis of the reaction mixture indicated that 70% of the theoretical amount of α,α-dimethylbenzyl alcohol had been formed. Some acetophenone was also produced. The somewhat lower yield of alcohol and slower reaction rate than that obtained with cobaltous hydroxide may be attributed to the low solubility ($K_{sol.}=4\times10^{-14}$) of the manganous hydroxide, as a consequence of which, the number of electrons available for reaction at any particular instant was sharply reduced.

EXAMPLE 4

To 38 parts of water was added 0.42 part of sodium pyrophosphate decahydrate $$(Na_4P_2O_7.10H_2O)$$

When the sodium pyrophosphate was completely dissolved, 0.0175 part of a reaction product containing 46% α,α-dimethylbenzyl hydroperoxide suspended in seven parts of water was added with agitation. The α,α-dimethylbenzyl hydroperoxide was followed by the addition of 0.047 part of ferrous sulfate heptahydrate ($FeSO_4.7H_2O$) dissolved in five parts of water. The pH of the resultant reaction mixture was 10.2. One day after the addition of the ferrous sulfate had been completed, analysis indicated that 91% of the α,α-dimethylbenzyl hydroperoxide had been decomposed and that 72% of the theoretical amount of acetophenone had been formed.

This example indicates that metallic reducing agents, which in their normal state, would be inoperable to produce a particular alcohol or ketone may be altered by complexing the same with certain organic or inorganic complexing reagents in such a manner that the desired oxidation-reduction potential is obtained. Thus, ferrous hydroxide, which would normally be produced at a pH of 10.2, forms a couple, the standard oxidation-reduction potential of which is +0.56 volt, and would react with α,α-dimethylbenzyl hydroperoxide to produce α,α-dimethylbenzyl alcohol. However, by complexing the ferrous ions present with pyrophosphate ions, it is possible, as indicated by this example, to produce a metallic reducing agent, the standard oxidation-reduction potential of which is within the range of from about −1.0 volt to about −0.3 volt and thus produce acetophenone in near quantitative yield. The α,α-dimethylbenzyl hydroperoxide employed was prepared by the air oxidation of cumene and contained in addition to the hydroperoxide 2% α,α-dimethylbenzyl alcohol, 3.2% acetophenone and 48.8% unreacted cumene.

EXAMPLE 5

α,α-Dimethylbenzyl hydroperoxide in dilute aqueous solution was admixed at a pH of 3.2, 2.7, and 1.8 with aqueous ferrous sulfate in such a manner that there was present for each hydroperoxide molecule 0.28 ferrous ion. Analyses of portions of the reaction mixture were made after approximately three hours and after three and seven days following the addition of the ferrous sulfate. The results of these analyses appear in Table 2.

A similar dilute aqueous suspension of α,α-dimethylbenzyl hydroperoxide was admixed with aqueous ferrous sulfate at a pH of 3.0 in such a manner that there was present 14.4 ferrous ions per hydroperoxide molecule. Approximately three hours after the addition of the ferrous sulfate, 89% of the α,α-dimethylbenzyl hydroperoxide had been converted to acetophenone as indicated in Table 2.

*Table 2*

| Number of Fe++ Ions per Hydroperoxide Molecule | pH | Reaction Time | Per Cent of Original Hydroperoxide Decomposed | Per Cent of Theoretical Amount of Acetophenone Formed Based on Amount of Hydroperoxide Decomposed |
|---|---|---|---|---|
| 0.28 | 3.2 | 2-3 hours | 17 | 18 |
| 0.28 | 3.2 | 3 days | 17 | 18 |
| 0.28 | 3.2 | 7 days | 20 | 25 |
| 0.28 | 2.7 | 2-3 hours | 23 | 18 |
| 0.28 | 2.7 | 3 days | 26 | 23 |
| 0.28 | 2.7 | 7 days | 31 | 25 |
| 0.28 | 1.8 | 2-3 hours | 20 | 18 |
| 0.28 | 1.8 | 3 days | 24 | 23 |
| 0.28 | 1.8 | 7 days | 37 | 29 |
| 0 | 1.4 | 2-3 hours | 5 | 0 |
| 0 | 1.4 | 3 days | 20 | 4 |
| 0 | 1.4 | 7 days | 34 | 9 |
| 1.65 | 3.2 | Instant | 100 | ¹ 87 |
| 14.4 | 3.0 | do | 100 | ¹ 89 |

¹ 1.14 ferrous ions consumed per hydroperoxide molecule decomposed.

It is apparent from an examination of the above table that action of the metallic reducing agent is not merely catalytic in effect. It is further apparent that there is required for each hydroperoxide molecule decomposed, approximately that amount of reducing agent which is capable of donating one electron. Likewise, it is evident that no particular advantages such as increased yield or reaction rate are resultant from the utilization of a quantity of reducing agent appreciably in excess of that required to provide one electron per hydroperoxide molecule.

EXAMPLE 6

A suspension of 32.4 parts of ferrous chloride tetrahydrate ($FeCl_2.4H_2O$) in 178 parts of glacial acetic acid was prepared. To this suspension was added dropwise with agitation over a period of about 50 minutes, 100 additional parts of glacial acetic acid in which was dissolved 18.5 parts of α,α-dimethylbenzyl hydroperoxide. The reaction was carried out in a closed system at a temperature of 20-25° C. By this means 83% of the original α,α-dimethylbenzyl hydroperoxide was converted to acetophenone. This example shows that the process of this invention may be carried out in organic solvents.

EXAMPLE 7

Three hundred and sixty-five parts of a water solution of α,α-dimethyl-p-methylbenzyl hydroperoxide containing 0.398 part of the hydroperoxide, and 515 parts of water were placed in a closed vessel after nitrogen had been swept through the total water solution to remove any air present. In the absence of air there then was added to the vessel 12 parts of 0.0413 N ferrous sulphate solution. The reaction was complete in less than five minutes, about 1.3 Fe$^{++}$ per hydroperoxide molecule having been consumed. Analysis of the reaction mixture indicated that a 97% yield of p-methylacetophenone was obtained.

EXAMPLE 8

One hundred parts of $\alpha,\alpha,\alpha',\alpha'$-tetramethyl-p-xylylene dihydroperoxide and 6000 parts of water from which air had been removed by sweeping with nitrogen were placed in a closed reaction vessel. To the vessel then was added 2000 parts of an aqueous solution of ferrous sulfate containing 402 parts of FeSO$_4$.7H$_2$O. The temperature was about 20° C., and the amount of ferrous sulfate represented 1.93 Fe$^{++}$ per hydroperoxy group. Immediate reaction occurred, as evidenced by color change, and the vessel was maintained at a constant temperature of 25° C. for 1.3 hours, after which analysis showed that 1.18 Fe$^{++}$ per hydroperoxy group had been consumed. After an additional 16 hours at 25° C. the ferrous ion content was the same as after 1.3 hours, consequently the reaction was terminated.

The insoluble material present, which was composed of organic material and ferric hydroxide, was filtered off, the precipitate extracted with ethyl ether, the ether removed from the extract, and the extracted organic material dried to constant weight to give 15.9 parts of a solid product. A portion of the latter was purified by recrystallization, once from petroleum ether and once from a mixture of petroleum ether and ethyl ether. The purified product was composed of white, soft, flaky odorless crystals, and was identified by melting point (112.5°-113.5° C.) and carbon-hydrogen analysis as p-acetylacetophenone. Further evaluation of the original product showed the presence of p-acetyl-$\alpha,\alpha$-dimethylbenzyl alcohol, and analysis indicated that approximately 60% of the total ketone groups theoretically capable of being formed, based on the dihydroperoxide, actually had been formed.

As previously indicated, the nature of the products which may be produced in accordance with the process of this invention is dependent upon the relative strength of the electromotive couples which may be utilized. Those reducing agents, which under the reaction conditions, form a couple which is characterized by a standard oxidation-reduction potential of from about −1.0 volt to about −0.3 volt react with the $\alpha,\alpha$-dialkylarylmethyl hydroperoxides to produce aromatic ketones. Likewise, those reducing agents which form couples having a standard oxidation-reduction potential greater than about −0.2 volt react to produce tertiary alcohols containing an aromatic nucleus, and those metallic reducing agents which form couples, the standard oxidation-reduction potential of which is within the intermediate range of from about −0.3 volt to about −0.2 volt react to form mixtures of such tertiary alcohols and aromatic ketones. Metallic reducing agents which form couples of standard oxidation-reduction potential of less than about −1.0 volt do not react.

It is known in the art that various metallic reducing agents may be complexed or otherwise modified with various organic or inorganic radicals to produce couples characterized by standard oxidation-reduction potentials quite at variance to those of the uncomplexed material. By this means, reducing agents which, in their normal state, are inoperable to produce a particular alcohol or ketone as a consequence of forming a couple of improper standard oxidation-reduction potential, may be utilized. Likewise, variations of the pH at which the reaction is carried out, and the solubility of the various metallic reducing agents employed may effect the nature of the couples formed. As previously mentioned, the term "metallic reducing agent" is employed herein to designate all those reducing agents in which metallic atoms are present. Table 3 constitutes a list of some of the operable reducing agents which may be employed and the products thereby obtainable in accordance with this invention. For the data of Table 3 and data on additional operable couples, reference is made to Lange, Handbook of Chemistry, 6th ed., pages 1073 and 1074, and to Latimer and Hildebrand, Reference Book of Inorganic Chemistry, revised ed. (1940), Appendix 2, pages 474–481, for a tabulation of the electromotive couples formed by the metallic reducing agents under various reaction conditions and of the standard oxidation-reduction potentials of these couples.

*Table 3*

| Reducing Agent | Couple Formed | Standard Oxidation-Reduction Potential of Couple | Major Product Formed When Reacted With $\alpha,\alpha$-Dialkylarylmethyl Hydroperoxide |
|---|---|---|---|
| Fe(OH)$_2$ | Fe(OH)$_2$+OH$^-$ ⟶ Fe(OH)$_3$+$e^-$ | +0.56 | Tertiary alcohol. |
| Cr$^{++}$ | Cr$^{++}$ ⟶ Cr$^{+++}$+$e^-$ | +0.41 | Do. |
| Mn(OH)$_2$ | OH$^-$+Mn(OH)$_2$ ⟶ Mn(OH)$_3$+$e^-$ | +0.40 | Do. |
| Ti$^{++}$ | Ti$^{++}$ ⟶ Ti$^{+++}$+$e^-$ | +0.37 | Do. |
| C.(Cn)$_6^{-4}$ | Co(Cn)$_6^{-4}$ ⟶ Co(Cn)$_6^{-3}$+$e^-$ | +0.30 | Do. |
| V$^{++}$ | V$^{++}$ ⟶ V$^{+++}$+$e^-$ | +0.20 | Do. |
| Cu$_2$O | Cu$_2$O+2OH$^-$ ⟶ 2CuO+H$_2$O+2$e^-$ | +0.15 | Do. |
| Sn$^{++}$ | Sn$^{++}$ ⟶ Sn$^{++++}$+2$e^-$ | −0.15 | Do. |
| Cu$^+$ | Cu$^+$ ⟶ Cu$^{++}$+$e^-$ | −0.17 | Do. |
| Co(OH)$_2$ | Co(OH)$_2$+OH$^-$ ⟶ Co(OH)$_3$+$e^-$ | −0.20 | Do. |
| PbO | PbO+2OH$^-$ ⟶ PbO$_2$+H$_2$O+2$e^-$ | −0.3 | Aromatic ketone. |
| Ni(OH)$_2$ | Ni(OH)$_2$+2OH$^-$ ⟶ NiO$_2$+2H$_2$O+2$e^-$ | −0.49 | Do. |
| CuCl | CuCl ⟶ Cu$^{++}$+Cl$^-$+$e^-$ | −0.566 | Do. |
| Se | Se+3H$_2$O ⟶ H$_2$SeO$_3$+4H$^+$+4$e^-$ | −0.74 | Do. |
| Fe$^{++}$ | Fe$^{++}$ ⟶ Fe$^{+++}$+$e^-$ | −0.748 | Do. |
| Ag | Ag ⟶ Ag$^+$+$e^-$ | −0.799 | Do. |
| Mn$^{++}$ | Mn$^{++}$ ⟶ Mn$^{+++}$+$e^-$ | −1.51 | No reaction. |
| Co$^{++}$ | Co$^{++}$ ⟶ Co$^{+++}$+$e^-$ | −1.84 | Do. |

The process of this invention is preferably practiced by the gradual addition with agitation of an aqueous solution or suspension of the metallic reducing agent employed to an aqueous suspension of an $\alpha,\alpha$-dialkylarylmethyl hydroperoxide. However, the entire quantity of the metallic reducing agent may be added at one time. Likewise, the aqueous suspension of $\alpha,\alpha$-dialkylarylmethyl hydroperoxide may be added to the solution of the metallic reducing agent or the two reactants may be simultaneously charged into the reaction vessel. If desired, an aqueous solution or suspension of the reducing agent may be admixed with a substantially anhydrous hydroperoxide. Likewise, an anhydrous, liquid, organic medium of polar nature in which ionization is possible may be utilized. Glacial acetic acid is exemplary of such a medium. The quantity of aqueous or liquid polar organic medium utilized may be varied widely, but it is necessary that there be sufficient aqueous or polar organic medium present to permit ionization to occur. Whatever the order or method of addition of the reactants, it is desirable that the reaction mixture be thoroughly agitated and that the reaction be effected in an inert atmosphere to prevent air oxidation of the metallic reducing agent.

It is preferred that the metallic reducing agent be employed in such amount that there is added in the reaction mixture a sufficient quantity thereof to provide one electron for each hydroperoxy radical it is desired to reduce. Near quantitative yields of the tertiary alcohols or aromatic ketones resultant from the decomposition of $\alpha,\alpha$-dialkylarylmethyl hydroperoxides may be obtained if this quantity of reducing agent is employed. Greater concentrations of metallic reducing agent may be utilized, if desired, but no particular advantages such as increased yield or greater reaction rate are thereby attained. The utilization of such an amount of metallic reducing agent that there is added to the reaction mixture less than that amount required to provide one electron for each hydroperoxy radical results in a correspondingly lower yield of the desired product. These results indicate that the organic hydroperoxide decomposition reaction of this invention is one of electron transfer. Thus, there must be provided one electron for each hydroperoxy radical it is desired to reduce. However, some reduction of the metallic reducing agents oxidized in the course of this reaction may occur by a reverse electron transfer mechanism, consequently some metallic ions may take part in the decomposition of two or more hydroperoxy radicals. In such instances slightly less than that amount of reducing agent required to provide one electron per hydroperoxy radical may sometimes be consumed. Particularly is this true when the reaction is effected in an inert atmosphere. When the reaction is not carried out in such an inert atmosphere, a slight excess of reducing agent should be employed to compensate for the loss due to air oxidation.

The process of this invention may be carried out at any temperature below the thermal decomposition point of the $\alpha,\alpha$-dialkylarylmethyl hydroperoxide it is desirable to utilize, but for all practical purposes the temperature may be between about 0° and about 100° C. No particular advantage attends the use of elevated temperatures and the process is normally carried out at temperatures of about 20° to 25° C. It is an important feature of this invention, however, that the process thereof may be practiced at quite low temperatures, such as, for example, about 0° C. to about −70° C., and at such temperatures the process may be carried out in an aqueous medium by the utilization of a water-soluble organic compound of low freezing point as antifreeze agent. The reaction medium may be, for example, a mixture of water with methanol, ethylene glycol, glycerol, or other aliphatic alcohol, glycol or polyglycol.

Although this invention has heretofore primarily been described as operable in aqueous medium, it may be practiced in organic media of polar nature in which ionization may occur. Thus, the process of this invention may be carried out in a solvent such as glacial acetic acid illustrated by Example 6.

As has been pointed out, indications are that the decomposition reaction of this invention involves a transfer of electrons. Using the reaction between $\alpha,\alpha$-dimethylbenzyl hydroperoxide and the ferrous (Fe$^{++}$) ion as an example, the formation of several of the reaction products known to be formed may be explained as follows:

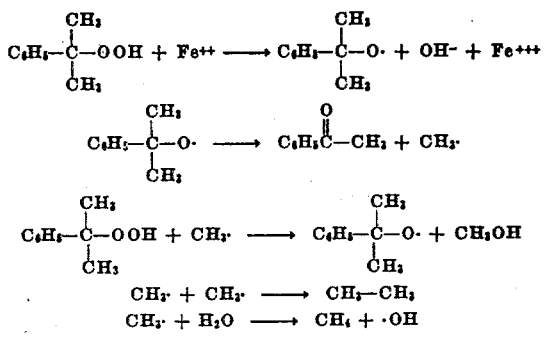

As indicated by the above equations, critical analysis of the reaction products of the process of this invention has shown the presence of methane, ethane and methanol in addition to the principal products of the reaction. The reaction therefore, in addition to being produced by an electron transfer, probably involves the formation, rearrangement and reaction of free radicals.

By virtue of this invention tertiary alcohols containing an aromatic nucleus and aromatic ketones may be economically produced in near quantitative yield from $\alpha,\alpha$-dialkylarylmethyl hydroperoxides. These important compounds find many uses as quotation agents, perfume bases, wetting-out agents, and the like. This invention accordingly constitutes a most important and significant advance in the art.

What we claim and desire to protect by Letters Patent is:

1. The process of producing aromatic ketones and tertiary alcohols containing an aromatic nucleus which comprises reacting an $\alpha,\alpha$-dialkylarylmethyl hydroperoxide with the reduced form of an electromotive couple having a standard oxidation-reduction potential not less than about −1.0 volt.

2. The process in claim 1 wherein the reduced form of electromotive couple is in such concentration that there is provided about one electron for each hydroperoxy radical present in the hydroperoxide.

3. The process of claim 1 in which the hydroperoxide is $\alpha,\alpha$-dimethylbenzyl hydroperoxide and in which the alcohol produced is $\alpha,\alpha$-dimethylbenzyl alcohol and the ketone produced is acetophenone.

4. The process of claim 1 in which the hydroperoxide is $\alpha,\alpha$-dimethyl-p-methylbenzyl hydroperoxide and in which the alcohol produced is $\alpha,\alpha$-dimethyl-p-methylbenzyl alcohol and the ketone produced is p-methylacetophenone.

5. The process of claim 1 in which the hydroperoxide is $\alpha,\alpha,\alpha',\alpha'$-tetramethyl-p-xylylene dihydroperoxide and in which the alcohol produced is $\alpha,\alpha,\alpha',\alpha'$-tetramethyl-p-xylylene dialcohol and the ketone produced is p-acetylacetophenone.

6. The process which comprises reacting a tertiary organic hydroperoxide having the structural formula

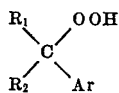

with the reduced form of an electromotive couple having a standard oxidation-reduction potential between about $-1.0$ volt and about $-0.3$ volt to produce an aromatic ketone having the structural formula $$Ar-\overset{O}{\underset{\|}{C}}-R$$

and Ar has the same significance in both structural formulae and represents a substituent selected from the group consisting of aryl and alkaryl groups, and $R_1$ and $R_2$ in the structural formula for the hydroperoxide represent alkyl groups and R in the structural formula for the aromatic ketone represents that one of the two alkyl groups represented by the symbols $R_1$ and $R_2$ in the structural formula for the hydroperoxide which is bound to the hydroperoxide molecule by the strongest carbon-carbon bond.

7. The process of claim 6 in which the reduced form of the electromotive couple is in such concentration that there is provided about one electron for each hydroperoxy radical present in the hydroperoxide.

8. The process of claim 6 in which the hydroperoxide is $\alpha,\alpha$-dimethylbenzyl hydroperoxide and in which the ketone produced is acetophenone.

9. The process of claim 6 in which the hydroperoxide is $\alpha,\alpha$-dimethyl-p-methylbenzyl hydroperoxide and in which the ketone produced is p-methylacetophenone.

10. The process of claim 6 in which the hydroperoxide is $\alpha,\alpha,\alpha',\alpha'$-tetramethyl-p-xylylene dihydroperoxide and in which the ketone produced is p-acetylacetophenone.

11. The process which comprises reacting $\alpha,\alpha$-dimethylbenzyl hydroperoxide in acidic medium with ferrous ions to produce acetophenone.

12. The process which comprises reacting a tertiary organic hydroperoxide having the following structural formula

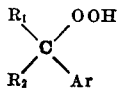

with the reduced form of an electromotive couple having a standard oxidation-reduction potential not less than about $-0.2$ volt to produce a tertiary alcohol having the structural formula

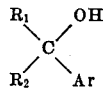

and $R_1$ and $R_2$ have the same significance in both structural formulae and represent alkyl groups, and Ar has the same significance in both structural formulae and represents a substituent selected from the group consisting of aryl and alkaryl groups.

13. The process of claim 12 in which the reduced form of the electromotive couple is in such concentration that there is provided about one electron for each hydroperoxy radical present in the hydroperoxide.

14. The process of claim 12 in which the hydroperoxide is $\alpha,\alpha$-dimethylbenzyl hydroperoxide and in which the alcohol produced is $\alpha,\alpha$-dimethylbenzyl alcohol.

15. The process of claim 12 in which the hydroperoxide is $\alpha,\alpha$-dimethyl-p-methylbenzyl hydroperoxide and in which the alcohol produced is $\alpha,\alpha$-dimethyl-p-methylbenzyl alcohol.

16. The process of claim 12 in which the hydroperoxide is $\alpha,\alpha,\alpha',\alpha'$-tetramethyl-p-xylylene dihydroperoxide and in which the alcohol produced is $\alpha,\alpha,\alpha',\alpha'$-tetramethyl-p-xylylene dialcohol.

17. The process which comprises reacting $\alpha,\alpha$-dimethylbenzyl hydroperoxide in acidic medium with stannous ions to produce $\alpha,\alpha$-dimethylbenzyl alcohol.

GEORGE E. HULSE.
EDWIN J. VANDENBERG.

REFERENCES CITED

The following references are of record in the file of this patent:

UNITED STATES PATENTS

| Number | Name | Date |
|---|---|---|
| 1,813,606 | Binapfl et al. | July 7, 1931 |
| 2,462,103 | Johnson | Feb. 22, 1949 |

OTHER REFERENCES

Allen: "Organic Syntheses," (Wiley & Sons, N. Y.), vol. 20, pages 94–6 (1940).